United States Patent [19]

Glasstetter et al.

[11] 4,367,208

[45] Jan. 4, 1983

[54] PROCESS FOR THE MANUFACTURE OF BATTERY CARBON BLACK

[75] Inventors: Fred E. Glasstetter, Yardley, Pa.; Frank J. Eckert, Monroe, La.

[73] Assignee: Columbian Chemicals Company, Tulsa, Okla.

[21] Appl. No.: 278,953

[22] Filed: Jun. 30, 1981

Related U.S. Application Data

[63] Continuation-in-part of Ser. No. 52,365, Jun. 27, 1979, abandoned.

[51] Int. Cl.$^3$ .......................... C01B 31/02; C09C 1/48
[52] U.S. Cl. ...................................... 423/450; 429/232
[58] Field of Search ............... 423/449, 450, 445, 460, 423/461; 429/232

[56] References Cited

FOREIGN PATENT DOCUMENTS 51-80933  7/1976  Japan .................................. 429/232

OTHER PUBLICATIONS

Kotlensky et al. Proceedings Fourth Conference for Carbon, 1960, p. 423.

*Primary Examiner*—O. R. Vertiz
*Assistant Examiner*—Gregory A. Heller
*Attorney, Agent, or Firm*—Walter M. Benjamin

[57] ABSTRACT

A process useful for the production of a carbon black useful as an ingredient in dry cell battery compositions is disclosed which comprises heating a carbon black feedstock having a dibutylphalate absorption (DBP) ranging from 200 to 250 cc/100 g, nitrogen surface area ranging from about 30 to about 60 m$^2$/g, an average stacking height ($L_c$) of ordered graphitic layer segments ranging from about 1.1 to about 1.5 nm, and a wide aggregate size distribution with a range of measured aggregate volume from about $5 \times 10^4$ to about $1 \times 10^9$ nm$^3$, a geometric mean aggregate volume (Log Vg, nm$^3$) of about 6.2 to about 7.5, and geometric standard deviation (for Log Vg, nm$^3$) of about 0.7 to about 1.0. This feedstock is heated to a temperature ranging from 1400° C. to 2400° C. under an inert atmosphere, thereby producing a carbon black having a DBP ranging from about 210 to about 270 cc/100 g, essentially the same nitrogen surface area, essentially the same aggregate volume and standard deviation, and an $L_c$ ranging from about 1.6 to about 3.7 nm.

9 Claims, No Drawings

PROCESS FOR THE MANUFACTURE OF BATTERY CARBON BLACK

BACKGROUND OF THE INVENTION

This is a continuation-in-part of U.S. patent application Ser. No. 52,365 filed 6-27-1979, now abandoned.

The present invention pertains to the production of carbon black and more particularly pertains to the production of an oil furnace carbon black which can be used as an ingredient in dry cell battery compositions. It is well known that carbon blacks are included in dry cell battery compositions in order to impart increased electrolyte capacity, improved discharge characteristics, and other desirable properties to battery compositions. In the past, acetylene-type blacks were the carbon blacks of choice for battery formulations since they imparted the best balance of properties to battery compositions which contain them. Acetylene black is produced by decomposing the acetylene at temperatures higher than 2300° in an oxygen-containing atmosphere.

Prior art also includes W. V. Kotlensky and P. L. Walker, *Proceedings Fourth Conference for Carbon,* 1960, page 423, where it is disclosed that carbon blacks are treated in an inert atmosphere at temperatures ranging from about 1000° C. to about 2800° C. and crystal growth is observed. Average values for the stacking height ($L_c$) of ordered graphitic layer segments (described as "crystallites" in this and other early literature references) ranging from about 1.6 to about 14.8 nm were attained by heating carbon blacks having average particle diameters ranging from about 10 to about 560 nm (and dibutylphthalate absorptions (DBP) by today's standard ranging from about 35 to about 230 cc/100 g).

The prior art further includes U.S. Pat. No. 4,061,719 which discloses a process for the production of carbon black useful in dipolarization masses of dry cell batteries. The process includes the mixing of an aqueous suspension of a carbon black having an absorption stiffness number higher than 15 and having been obtained by subjecting liquid hydrocarbons to thermal conversion at temperatures of 1200° C. and 2000° C. and pressures of 1 to 80 atmospheres in the presence of oxygen-containing gases, water scrubbing the resulting carbon black containing reaction gas, mixing the resultant carbon-black-containing solution with 0.5 to 10 g of a liquid vaporizable aliphatic or cycloaliphatic hydrocarbons per gram of carbon black, separating the resulting carbon black from the liquid phase, heating the carbon black to free the black from the hydrocarbons and the water and heating the black to 1100° C. to 2200° C. over a period of 2 up to 30 minutes. The black produced by this process has a nitrogen surface area of between 100 and 1000 square meters per gram and a mean particle size of 25 to 65 microns, (sic, it is most probably that the mean particle size is 25 to 65 nm).

SUMMARY OF THE INVENTION

It is an object of this invention to provide a process for the treatment of a carbon black which can be used in dry cell battery compositions. Another object of this invention is to provide a process for the treatment of an oil furnace carbon black which will impart properties to a dry cell composition which are at least equivalent to, if not superior to, the properties imparted by acetylene black. These and other objects will become apparent to those skilled in the art as the following description procedes.

Broadly, this invention is a process for making a carbon black useful as an ingredient in dry cell battery compositions which comprises heating a carbon black feedstock having a dibutylphalate absorption ranging from 200 to 250 cc/100 g, a nitrogen surface area ranging from 30 to about 60 m²/g, an average stacking height ($L_c$) of ordered graphitic layer segments ranging from 1.1 to about 1.5 nm, and a wide aggregate size distribution with a range of measured aggregate volume from about $5 \times 10^4$ to about $1 \times 10^9$ nm³, a geometric mean aggregate volume (Log Vg, nm³) of about 6.2 to about 7.5, and geometric standard deviation (for Log Vg, nm³) of about 0.7 to about 1.0. This feedstock is heated to a temperature ranging from 1400° C. to 2400° C. under an inert atmosphere.

Additionally this invention is a process for making an oil furnace carbon black having the above aggregate volume and standard deviation, the above nitrogen surface, DBP ranging from about 210 to about 270 cc/100 g, and an $L_c$ ranging from about 1.6 to about 3.7 nm comprising:

a. heating an oil furnace feedstock having the aforedescribed properties to a temperature ranging from 1400° C. to 2400° C. for about 9 seconds to about 10 minutes, preferably between about 9 seconds and 2 minutes and even more preferably between about 9 seconds and 21 seconds under an inert atmosphere.

b. cooling said heated carbon black to a temperature below 325° C. under an inert atmosphere.

DETAILED DESCRIPTION OF THE INVENTION

The process of this invention is useful for the production of a carbon black used as an ingredient in dry cell battery compositions. The carbon black produced generally has a wide aggregate size distribution, with a range of measured aggregate volume from about $5 \times 10^4$ to about $1 \times 10^9$ nm³, a geometric mean aggregate volume (Log Vg, nm³) of about 6.2 to about 7.5, and geometric standard deviation (for Log Vg, nm³) of about 0.7 to about 1.0, a DBP of between about 210 and 220 cc/100 g, a nitrogen surface area between 30 and 60 m²/g and an $L_c$ between about 2.7 and 3.7 nm.

It is not known, but it is thought and preferred, that the carbon black has a bimodal and broad aggregate size distribution. Further, it is preferred that it has a DBP of about 250 cc/100 g, and a nitrogen surface area of between 40 and 50 m²/g.

A carbon black feedstock used in the process of this invention has a wide aggregate distribution, with a range of measured aggregate volume from about $5 \times 10^4$ to about $1 \times 10^9$ nm³, a geometric mean aggregate volume (Log Vg, nm³) of about 6.2 to about 7.5, and geometric standard deviation (for Log Vg, nm³) of about 0.7 to about 1.0, a nitrogen surface area ranging from 30 to about 60 m²/g and a DBP ranging from 200 to 250 cc/100 g. Preferably the feedstock has an $L_c$ of about 1.1 to about 1.5 nm and a percent volatile content below about 3.0. More preferably the feedstock has a water content of below about 0.5%.

Though not restricted thereto, a carbon black feedstock having such characteristics can be produced in a vertical, circular cross-section furnace of the general type described in U.S. Pat. No. 2,779,665, which is hereby incorporated by reference, by a process generally described and illustrated in U.S. Pat. No. 3,253,890, which is hereby incorporated by reference. The carbon black feedstock produced thereby is fed with inert carrier into a heating zone where it is heated to a temperature ranging from 1400° C. to 2400° C.

Suitable inert gases include nitrogen, helium and hydrogen with minimal concentrations of oxygen and water. Preferably, the carrier is nitrogen.

Preferably, the black is heated to about 2200° C. at a rate between 100° C./second and 150° C./second for a heating time ranging from 9 seconds to 21 seconds.

Since it is generally impossible to attain an oxygen-free or water-free atmosphere and since the linings of high temperature furnaces are preferably constructed of graphite, a two zone heating furnace is preferred. In the initial zone, the black is heated to a temperature in excess of 925° C. thereby converting any oxygen present into CO, $CO_2$ or $SO_2$. The zone is constructed of a material such as RA-330 pipe. The heated carbon black at a temperature between 565° C. to 760° C. is fed into the graphite lined second zone and heated to 2200° C. The atmosphere, following the discharge of the black from the furnace and while the black is at temperatures in excess of 315° C. is maintained free of oxygen and water so as to prevent oxidation of the black.

With regards to the production of a suitable carbon black feedstock, such properties as DBP and $L_c$ of the present carbon black products can be fully regulated over the limits of the claimed ranges, e.g. $L_c$ can be regulated by carrying the heating rate within the heating furnace and the maximum temperature attained by the carbon black. DBP can be regulated by introduction of alkali metal salts in varied amounts into the make oil feedstock. Surface area can be regulated by varying the flow rate of water into the furnace process and by regulation of temperature within the reaction chamber of the vertical furnace. The relatively low volatile content of the feedstock carbon blacks of this invention is incidental to their surface characteristics and the high temperature at which they are formed and to which they are reheated.

In the following is set forth an example of the invention which is given by way of illustration and not limitation. The specific concentrations, temperatures, times, ratios, etc. set forth in these examples are not to be construed to unduly limit the scope of the invention.

EXAMPLE 1

50 grams/second of a carbon black feedstock exhibiting the following properties:

| | |
|---|---|
| Log Vg, $nm^3$ (Geometric Mean) | 6.501 |
| Geometric Standard Deviation (for Log Vg, $nm^3$) | 0.791 |
| Surface Area, BET, $m^2/g$ | 40 |
| DBPA, cc/100 g | 225 |
| Volatile Content, % | 6.0 |
| Oxygen Content, % | 0.1 |
| $L_c$, nm | 1.2 | were fed with a nitrogen carrier at velocity of 1 meter/sec through a high temperature treating furnace measuring 13 meters in length and 0.1 meters in diameter. A pressure of 1.1 atm was maintained and the carbon black was discharged at a temperature of 1425° C.

The heat treated carbon black was allowed to cool under an inert atmosphere following recovery thereof and on testing was found to have the following properties:

| | |
|---|---|
| Log Vg, $nm^3$, (Geometric Mean) | 6.516 |
| Geometric Standard Deviation (for Log Vg, $nm^3$) | 0.782 |
| DBPA, cc/g | 250 |
| Surface area, BET, $m^2/g$ | 45 |
| Volatile Content, % | 0.2 |
| $L_c$, nm | 2.8 |
| Iodine Number | 62 |
| ABC Color | 89 |
| Tinting Strength (ASTM-03265 79) | 57 |

Acetylene black, (Shawingen, Inc.) which had previously been the dry cell battery black of choice, was utilized in preparation of a standard dry cell battery composition. This acetylene black was characterized by the following properties:

| | |
|---|---|
| Log Vg, $nm^3$ (Geometric Mean) | 6.625 |
| Geometric Standard Deviation (for Log Vg, $nm^3$) | 0.646 |
| DBP, cc/100 g | 235 |
| Surface Area, BET, $m^2/g$ | 54 |
| $L_c$, nm | 2.58 |

A second dry cell battery composition was prepared substituting the heat treated black of this Example in place of the acetylene black. The compositions were identical except for the carbon black constituent.

The properties of the two battery compositions were tested using ANSI specification C18.1-1972 for Light Intermittent Test (Lift) amperage output, and Heavy Intermittent Test (Hift), initially and after 12 weeks at 45° C. The following results for 2D cells were found to be the following:

| | Initial | | 12 wks @ 45° C. | |
|---|---|---|---|---|
| | Acet | Applicant's | Acet | Applicant's |
| 2.25 ohm Lift | 100% | 108% | 100% | 107% |
| 2.25 ohm Cont. | 100% | 108% | 100% | 101% |
| 2.25 ohm HIFT | 100% | 107% | 100% | 109% |
| 4 ohm LIFT | 100% | 110% | 100% | 113% |
| 4 ohm HIFT | 100% | 110% | 100% | 104% |
| 25 ohm 4H/D | 105% | 105% | 100% | 102% |

It can thus be seen that the presently claimed heat treated black is found to impart superior properties to battery compositions containing applicant's black over compositions containing acetylene black.

Therefore, carbon black products have been developed which were heretofore unknown and unobvious in that they are characterized by such a different combination of properties as would have previously caused one skilled in the art to doubt that they could have utility. More particularly, these new blacks are different in being characterized by a wider aggregate size distribution and higher average stacking height, $L_c$, or ordered graphitic layer segments.

I claim:

1. A process for making a carbon black useful as an ingredient in dry cell battery compositions which comprises:
    a. heating a carbon black having a DBP ranging from 200 to 250 cc/100 g and a wide aggregate size distribution with a range of measured aggregate volume from about $5 \times 10^4$ to about $1 \times 10^9$ $nm^3$, a geometric mean aggregate volume, Log Vg, $nm^3$, of about 6.2 to about 7.5, and geometric standard deviation, for Log Vg, nm$^3$, of about 0.7 to about 1.0 to a temperature ranging from 1400° C. to 2400° C. under an inert atmosphere for a time period ranging from about 9 seconds to about 10 minutes.

b. cooling said heated carbon black to a temperature below 324° C. under an inert atmosphere.

2. The process of claim 1 wherein the carbon black is heated for a time period ranging from between 9 seconds and 2 minutes.

3. The process of claim 1 wherein the carbon black is heated for a time period ranging from between 9 seconds and 21 seconds.

4. The process of claim 1 wherein the carbon black is heated at a rate of between about 100° C./sec and 150° C./sec.

5. The process of claim 1 wherein said aggregate size distribution of said carbon black feedstock is bimodal.

6. The process of claim 1 wherein the carbon black has a nitrogen surface area of between 30 to 60 m$^2$/g.

7. A process for making an oil furnace carbon black having a wide aggregate size distribution with a range of measured aggregate volume from about $5 \times 10^4$ to about $1 \times 10^9$ nm$^3$, a geometric mean aggregate volume, Log Vg, nm$^3$, of about 6.2 to about 7.5, and geometric standard deviation for Log Vg, nm$^3$, of about 0.7 to about 1.0, a dibutylphalate absorption, DBP, ranging from about 210 to about 270 cc/100 g, a nitrogen surface area ranging from about 30 to about 60 m$^2$/g and an L$_c$ ranging from about 2.7 to about 3.7 nm comprising:

a. heating an oil furnace carbon black having a DBP ranging from 200 to 250 cc/100 g and a wide aggregate distribution with a range of measured aggregate volume from about $5 \times 10^4$ to about $1 \times 10^9$ nm$^3$, a geometric mean aggregate volume, Log Vg, nm$^3$, of about 6.2 to about 7.5, and geometric standard deviation, for Log Vg, nm$^3$, of about 0.7 to about 1.0, to a temperature ranging from 1400° C. to 2400° C. under an inert atmosphere for a time period ranging from about 9 seconds to about 10 minutes; and b. cooling said heated carbon black to a temperature below 325° C. under an inert atmosphere.

8. The process of claim 7, wherein the carbon black is heated for a time period ranging from between 9 seconds and 2 minutes.

9. The process of claim 7, wherein the carbon black is heated for a time period ranging from between 9 seconds and 21 seconds.

* * * * *